United States Patent Office 2,850,499
Patented Sept. 2, 1958

2,850,499

β-AMINO-α-PHENYLETHYL CHLORO-CARBANILATES

Kurt J. Rorig, Evanston, Ill., assignor to G. D. Searle & Co., Chicago, Ill., a corporation of Delaware No Drawing. Application January 10, 1956
Serial No. 558,186

9 Claims. (Cl. 260—294.3)

This invention relates to α-phenyl-β-aminoalkyl esters of halogenated carbanilic acids, the salts of such esters, and processes for the manufacture of these esters and their salts. More particularly, this invention relates to compounds of the formula

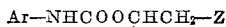

wherein Ar is a halogenated phenyl radical and Z is an amino radical which may—or may not—be alkylated.

In the foregoing structural formula, the halogenated phenyl radicals comprehended by Ar include o-, m-, and p-halophenyl radicals, as also polyhalophenyl radicals such as 2,4-dihalophenyl, 2,5-dihalophenyl, 2,4,6-trihalophenyl, etc. Preferred among such radicals are those wherein the specified halogen atom in each instance is chlorine, bromine, or iodine.

Z in the generic formula for compounds of this invention subsumes both the unsubstituted amino radical, —NH$_2$, and the amino radical as modified by introduction of one or two alkyl groups—especially lower alkyl groups, such as methyl, ethyl, propyl, isopropyl, butyl, isobutyl, secondary butyl, tertiary butyl, pentyl, secondary normal pentyl, primary isopentyl, secondary isopentyl, tertiary pentyl, and sundry hexyl groups. Where alkyl groups are present, these may be discrete, as when Z designates a radical of the formula

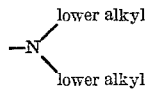

or, in the case of ethyl radicals, they may be joined together through oxygen to form the morpholino grouping

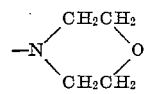

Still another variety of alkylated amino radicals contemplated is that in which Z is defined by

where T is an alkylene radical containing more than 3 and less than 8 carbon atoms, fewer than 6 of which are annularly disposed. It follows from this that

denotes a 5- or 6-membered heterocycle composed of methylene (—CH$_2$—) radicals and the single nitrogen atom shown, said heterocycle being optionally substituted by one or two alkyl groups aggregating not more than 3 carbon atoms. Illustrative of the cyclic amino radicals thus specified are pyrrolidinyl, 2-methylpyrrolidinyl, 2,5-dimethylpyrrolidinyl, 3-methyl-4-ethylpyrrolidinyl, piperidino, 3-methylpiperidino, and 2,6-dimethylpiperidino radicals.

Equivalent to the basic amino esters of this invention for the purposes here described are non-toxic acid addition and quaternary ammonium salts thereof, the composition of which may be symbolized by

wherein Ar and Z have the meanings hereinbefore assigned; R is selected from among hydrogen and lower alkyl, hydroxy (lower alkyl), and lower alkenyl radicals, as also such aralkyl radicals as benzyl, phenethyl, and naphthylmethyl; and X is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. For example, the subject compounds are anti-hypertensive agents, being capable of reducing the elevated blood pressures characteristic of multiple disease states. Moreover, the compounds of the present discovery are known to produce, in selected applications at particular dosage levels, a depressant effect on the central nervous system characterized by therapeutically desirable tranquility, ataraxia, and relaxation.

The amine bases which comprise this invention are relatively insoluble in water, but may be dissolved in dilute acids and in such of the common organic solvents as alcohol, ethyl acetate, ether, and benzene. The acid addition and quaternary ammonium salts of this invention are, on the other hand, soluble in water and in aqueous solutions of alcohol or other water-miscible organic solvents. The subject compounds may be administered in solid form as tablets or capsules; dissolved or suspended in aqueous media, they may be given parenterally.

The compounds of the present discovery may be manufactured as follows: an appropriate halophenyl isocyanate Ar—NCO is contacted with a suitable amino alcohol

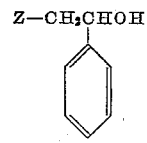

to produce a claimed tertiary base

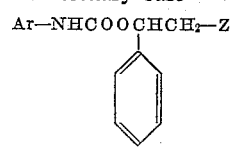

the terms Ar and Z being defined as before. Contact is maintained at temperatures ranging from 15° to 125° centigrade for periods of time amounting to from a few minutes to as long as several hours, lower temperatures generally being preferably as reaction time is increased, and vice-versa. One efficacious combination of temperature and time is 6 hours at 35° centigrade. The subject process may be carried out in solvent medium if desired, and while such is not essential, it appears to inhibit the formation of extraneous by-products in some instances. Satisfactory solvents include ether, chloroform, carbon tetrachloride, n-heptane, and like inert, non-polar, organic liquids.

Conversion of the amine bases of this invention to corresponding acid addition salts is accomplished by simple admixture of these compounds with one equivalent of any of various inorganic and strong organic acids, the anionic portion of which conforms to X as hereinabove defined.

The quaternary ammonium compounds comprehended by this invention are those derived by contacting a claimed base with an organic ester of the formula

R—X

R and X being limited by the meanings hereinbefore assigned. Quaternization takes place in the temperature range between 25° and 100° centigrade, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride— is one of the reagents. Using methyl bromide, the manufacture of quaternary salt may be smoothly effected in butanone solution at 70° centigrade, the reaction time being approximately 45 minutes.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

EXAMPLE 1

α-Phenyl-β-piperidinoethyl p-chlorocarbanilate hydrochloride

A mixture of 28 parts of α-phenylpiperidineethanol, 23 parts of p-chlorophenyl isocyanate, and 355 parts of anhydrous ether is let stand at room temperatures for 2 hours and then heated 5½ hours at the boiling point. Approximately 10 minutes before the end of the heating period, 8 parts of absolute ethanol is introduced to destroy excess isocyanate. A small amount of insoluble matter is filtered off, whereupon the filtrate is precipitated with an excess of hydrogen chloride dissolved in isopropyl alcohol. The oil which is thrown down solidifies on standing and is purified by recrystallization from a mixture of absolute ethanol and anhydrous ether. The α-phenyl-β-piperidinoethyl p-chlorocarbanilate hydrochloride thus obtained as an ivory powder melts at 219°–220° C. (with decomposition). It has the formula

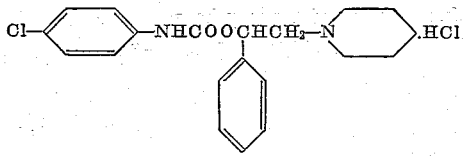

EXAMPLE 2

α-Phenyl-β-(1-pyrrolidinyl)ethyl o-chlorocarbanilate hydrochloride

A mixture of 19 parts of α-phenyl-pyrrolidineethanol, 31 parts of o-chlorophenyl isocyanate, and 355 parts of anhydrous ether is heated at reflux temperatures for 6 hours, a small amount of absolute ethanol being added at the close of the reaction period to destroy excess isocyanate. The product which results is divided into equal fractions, I and II.

Fraction I is precipitated with an excess of ethanolic hydrogen chloride. The product so precipitated is α-phenyl-β-(1-pyrrolidinyl)ethyl o-chlorocarbanilate hydrochloride, the formula of which is

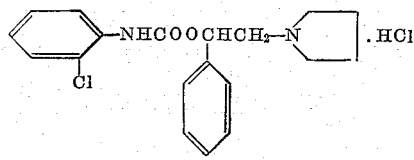

EXAMPLE 3

α-Phenyl-β-(1-pyrrolidinyl)ethyl o-chlorocarbanilate methiodide

Fraction II prepared by the procedure of the foregoing Example 2 is freed of solvent by evaporation in an inert atmosphere at approximately 90° C. The residue thus obtained is taken up in 80 parts of butanone, whereupon there is added 23 parts of methyl iodide. The resultant mixture is heated in a sealed kettle at 70° C. for approximately 48 hours. Solvent is then removed by evaporation at 90° C., leaving as a residue, α-phenyl-β-(1-pyrrolidinyl)ethyl o-chlorocarbanilate methiodide.

EXAMPLE 4

β-Dimethylamino-α-phenylethyl p-chlorocarbanilate hydrochloride

To 23 parts of α-(dimethylaminomethyl)-benzyl alcohol in 355 parts of anhydrous ether is added 23 parts of p-chlorophenyl isocyanate. A white precipitate forms. The reactants are thoroughly mixed and, after 2 hours at room temperature, heated to boiling and maintained thereat for an additional 3 hours. The precipitated white solid is filtered off, and the filtrate is divided into equal fractions, I and II.

Fraction I is precipitated by addition of slightly more than 1 equivalent of hydrogen chloride dissolved in isopropyl alcohol. The solid product thus obtained is purified by extraction into 640 parts of absolute ethanol and subsequent precipitation of this extract with approximately 700 parts of anhydrous ether. There results β-dimethylamino-α-phenylethyl p-chlorocarbanilate hydrochloride, the melting point of which is approximately 240°–241° C. (with decomposition). The product has the formula

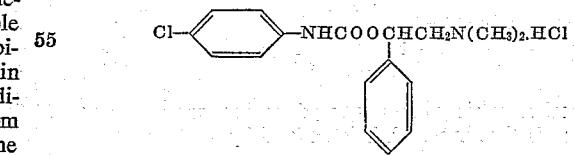

EXAMPLE 5

β-Dimethylamino-α-phenylethyl p-chlorocarbanilate methobromide

The other half of the reaction product obtained by the procedure of Example 4 (fraction II) is stripped of solvent by evaporation, leaving 19 parts of base, which is combined with 26 parts of methyl bromide in 120 parts of butanone. Precipitation occurs after approximately 5 minutes. The reactants are heated in a sealed kettle at approximately 70° C. for 45 minutes, then cooled to room temperature and let stand overnight. The crystalline product which is thrown down is separated and washed on a filter with butanone. There is obtained by these means white, shiny flakes of β-dimethylamino-α- phenylethyl p-chlorocarbanilate methobromide melting at 227–229.5° C. (with decomposition).

EXAMPLE 6

*β-Diethylamino-α-phenylethyl m-chlorocarbanilate hydrochloride*

A mixture of 27 parts of α-(diethylaminomethyl)benzyl alcohol, 23 parts of m-chlorophenyl isocyanate, and 355 parts of anhydrous ether is let stand at approximately 25° C. for 2 hours. The mixture is then refluxed for 4 hours, there being introduced 10 minutes before the end of the reflux period approximately 8 parts of absolute ethanol. After cooling, the mixture is combined with 1 equivalent of hydrogen chloride dissolved in isopropyl alcohol. An oil is thrown down which crystallizes on cooling. Recrystallization of the precipitate from a mixture of absolute ethanol and anhydrous ether affords white shiny flakes of β-diethylamino-α-phenylethyl m-chlorocarbanilate hydrochloride, the melting point of which is 178–180° C. (with decomposition). The product has the formula

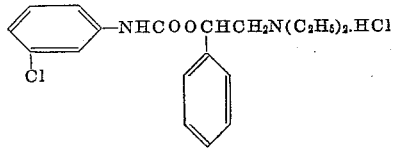

What is claimed is:

1. A compound selected from the group consisting of carbanilic acid esters and their non-toxic salts, said esters having the formula Ar—NHCOOCHCH₂—Z

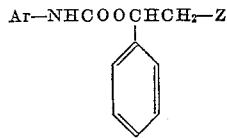

wherein Ar is a phenyl radical substituted by fewer than 4 chlorine atoms, and Z is selected from the group consisting of di(lower alkyl)amino, piperidinyl, and pyrrolidinyl radicals.

2. A non-toxic salt of a compound of the formula

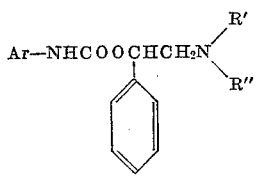

wherein Ar is a monochlorophenyl radical and R' and R" are lower alkyl radicals.

3. β-Dimethylamino-α-phenylethyl p-chlorocarbanilate hydrochloride.

4. β-Dimethylamino-α-phenylethyl p-chlorocarbanilate methobromide.

5. β-Diethylamino-α-phenylethyl m-dichlorocarbanilate hydrochloride.

6. A non-toxic salt of a compound of the formula

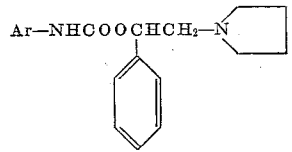

wherein Ar is a monochlorophenyl radical.

7. α-Phenyl-β-(1-pyrrolidinyl)ethyl o-chlorocarbanilate methiodide.

8. A non-toxic salt of a compound of the formula

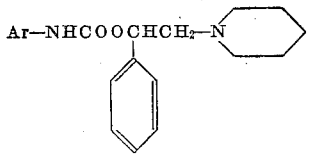

wherein Ar is a monochlorophenyl radical.

9. α-Phenyl-β-piperidinoethyl p-chlorocarbanilate hydrochloride.

No references cited.